(12) United States Patent
Toyoda

(10) Patent No.: US 7,555,957 B2
(45) Date of Patent: Jul. 7, 2009

(54) PRESSURE SENSOR EQUIPPED WITH PRESSURE SENSING DIAPHRAGM

(75) Inventor: Inao Toyoda, Anjo (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 11/896,804

(22) Filed: Sep. 6, 2007

(65) Prior Publication Data

US 2008/0060440 A1 Mar. 13, 2008

(30) Foreign Application Priority Data

Sep. 13, 2006 (JP) ............................. 2006-247950

(51) Int. Cl.
*G01L 7/08* (2006.01)
(52) U.S. Cl. ...................................... 73/715
(58) Field of Classification Search .................. 73/715, 73/756; 361/283.1, 283.4
See application file for complete search history.

(56) References Cited

U.S. PATENT DOCUMENTS

| | | | | |
|---|---|---|---|---|
| 4,776,218 A | * | 10/1988 | Sawa et al. | ..................... 73/721 |
| 5,471,883 A | | 12/1995 | Glaser | |
| 5,531,120 A | * | 7/1996 | Nagasu et al. | .................. 73/706 |
| 5,652,391 A | * | 7/1997 | Kingsford et al. | ............. 73/706 |
| 6,813,953 B2 | * | 11/2004 | Baba et al. | ..................... 73/715 |
| 6,843,132 B2 | | 1/2005 | Mizuno et al. | |
| 6,931,939 B2 | * | 8/2005 | Parravicini | .................... 73/756 |
| 7,311,006 B2 | * | 12/2007 | Yamashita | .................... 73/716 |
| 2003/0056603 A1 | * | 3/2003 | Massimo et al. | ......... 73/861.47 |
| 2003/0154794 A1 | * | 8/2003 | Textor | ........................ 73/706 |
| 2003/0200813 A1 | * | 10/2003 | Baba et al. | .................... 73/715 |
| 2004/0154404 A1 | * | 8/2004 | Parravicini | .................... 73/756 |
| 2007/0020113 A1 | * | 1/2007 | Yamashita | .................... 417/63 |

FOREIGN PATENT DOCUMENTS

| | | |
|---|---|---|
| EP | 0710827 A2 | 5/1996 |
| JP | H02-206738 | 8/1990 |
| JP | H08-136384 | 5/1996 |
| JP | 2004-347387 | 12/2004 |

* cited by examiner

*Primary Examiner*—Andre J Allen
(74) *Attorney, Agent, or Firm*—Posz Law Group, PLC

(57) ABSTRACT

A pressure sensor is provided which may be employed in measuring the combustion pressure in an internal combustion engine. The pressure sensor is equipped with a pressure sensing diaphragm assembly which includes a first diaphragm, a second diaphragm, and liquid or gel. The first diaphragm is flexible when exposed to pressure to be measured and joined to the second diaphragm to define a closed chamber filled with the liquid or gel to transmit the pressure to the second diaphragm. A pressure transmitting member is disposed in abutment with the second diaphragm to transmit the pressure, as transmitted from the first diaphragm, to a pressure sensing device. The inclusion of the liquid or gel in the closed chamber between the first and second diaphragms results in an increase in heat capacity of the diaphragm assembly to decrease the thermal distortion thereof without sacrificing the sensitivity of the pressure sensor.

23 Claims, 2 Drawing Sheets

PRESSURE SENSOR EQUIPPED WITH PRESSURE SENSING DIAPHRAGM

CROSS REFERENCE TO RELATED DOCUMENT

The present application claims the benefit of Japanese Patent Application No. 2006-247950 filed on Sep. 13, 2006, the disclosure of which is incorporated herein by reference.

BACKGROUND OF THE INVENTION

1. Technical Field of the Invention

The present invention relates generally to an improved structure of a pressure sensor equipped with a pressure-sensing diaphragm to be exposed to pressure, for example, produced by combustion of fuel in an automotive internal combustion engine.

2. Background Art

There have been proposed pressure sensors which include a casing, a pressure-sensing diaphragm fitted in an end of the casing, and a pressure transmitting member disposed inside the casing. For example, Japanese Patent First Publication No. 2004-347387 and U.S. Pat. No. 5,471,883 disclose such a type of pressure sensors designed to measure the pressure in a cylinder of an automotive engine. The pressure-sensing diaphragm has an outer surface formed as a pressure-exposed surface which flexes when exposed to the pressure to be measured. Such flexing action is transmitted to the pressure transmitting member within the casing.

Within the casing, a pressure sensing device made up of strain gauges is disposed which is sensitive to the pressure, as transmitted from the pressure transmitting member, to output an electric signal indicative thereof.

When it is required to measure the pressure in a combustion chamber of an internal combustion engine, it will cause the pressure-exposed surface of the pressure-sensing diaphragm to be distorted by the heat, as produced by the combustion of fuel within the combustion chamber, thus resulting in an error in an output from the pressure sensor.

In order to eliminate the above problem, the pressure sensor, as taught in Japanese Patent First Publication No. 2004-347387, is designed to have the pressure-exposed surface shaped to decrease the amount of thermal distortion thereof. The pressure sensor, as taught in U.S. Pat. No. 5,471,883, is designed to have a cooling mechanism disposed inside the pressure-sensing diaphragm to decrease the amount of thermal distortion thereof.

Usually, the state of combustion in the engine, that is, the pressure or temperature in the combustion chamber of the engine varies depending upon the speed of or load on the engine, thus resulting in a variation in thermal distortion of the pressure-sensing diaphragm. The pressure sensor taught in the former publication, therefore, has a difficulty in reducing all types of distortion of the pressure-exposed surface arising from different states of combustion in the engine.

The pressure sensor, as taught in the latter publication, has the cooling mechanism, thus resulting in complexity of the structure and an increase in manufacturing cost thereof.

SUMMARY OF THE INVENTION

It is therefore a principal object of the invention to avoid the disadvantages of the prior art.

It is another object of the invention to provide a pressure sensor equipped with a pressure-sensing diaphragm which is designed to minimize the thermal distortion of the diaphragm without use of a cooling mechanism.

The decreasing of the amount of thermal distortion of the diaphragm may be achieved by increasing the thickness of the diaphragm to increase the heat capacity thereof. This, however, results in a decrease in flexion of the diaphragm when exposed to the pressure, which leads to a decrease in sensitivity of the pressure sensor. In order to alleviate this problem, the inventor of this application has made the invention, as discussed below.

According to one aspect of the invention, there is provided a pressure sensor which may be employed in measuring the pressure, as produced by combustion in an internal combustion engine. The pressure sensor comprises: (a) a casing; (b) a pressure sensing device working to output a signal as a function of pressure exerted thereon; (c) a pressure sensing diaphragm assembly installed in the casing, the pressure sensing diaphragm assembly including a first diaphragm, a second diaphragm, and liquid, the first diaphragm having a pressure-exposed surface which is flexible when exposed to pressure to be measured, the first diaphragm being joined to the second diaphragm to define a closed chamber filled with the liquid to transmit the pressure acting on the pressure-exposed surface of the first diaphragm to the second diaphragm; and (d) a pressure transmitting member disposed in the casing to transmit the pressure, as transmitted from the first diaphragm to the second diaphragm through the liquid, to the pressure sensing device.

Specifically, the inclusion of the liquid in the closed chamber between the first and second diaphragms results in an increase in heat capacity of the diaphragm assembly to decrease the thermal distortion of the diaphragm assembly without sacrificing the sensitivity of the pressure sensor.

In the preferred mode of the invention, the liquid may be oil such as fluorine oil and silicon oil.

The first and second diaphragms have peripheries joined together to seal the closed chamber air-tightly which is filled with the liquid.

The peripheries of the first and second diaphragms may be jointed by laser-welding.

The first diaphragm is made of material which is higher in heat and erosion resistance than that of the second diaphragm.

The first diaphragm may be lower in spring constant than the second diaphragm to absorb a change in volume of the liquid arising from, for example, thermal expansion thereof to minimize transmission thereof to the second diaphragm.

The lowering of the spring constant of the first diaphragm is achieved by designing the first diaphragm to be smaller in thickness than the second diaphragm. The first diaphragm may also be designed to have a deformable area smaller in diameter than a deformable area of the second diaphragm.

The closed chamber has a thickness in a thickness-wise direction of the diaphragm assembly. The thickness of the closed chamber is smaller than a distance between ends of the closed chamber in a radius direction of the diaphragm assembly, thereby minimizing the loss in transmitting the pressure to the pressure transmitting member.

The casing may be designed to be mounted in a mount member to establish a thermal connection between the second diaphragm and the mount member. The pressure to be measured may be pressure, as produced by combustion in an engine.

According to the second aspect of the invention, there is provided a pressure sensor which comprises: (a) a casing; (b) a pressure sensing device working to output a signal as a function of pressure exerted thereon; (c) a pressure sensing diaphragm assembly installed in the casing, the pressure sensing diaphragm assembly including a first diaphragm, a second diaphragm, and gel, the first diaphragm having a pressure-exposed surface which is flexible when exposed to pressure to be measured, the first diaphragm being joined to the second diaphragm to define a closed chamber filled with the gel to transmit the pressure acting on the pressure-exposed surface of the first diaphragm to the second diaphragm; and (d) a pressure transmitting member disposed in the casing to transmit the pressure, as transmitted from the first diaphragm to the second diaphragm through the gel, to the pressure sensing device.

In the preferred mode of the invention, the gel is one of fluoro gel, silicone gel, and phlorosilicone gel.

The first and second diaphragms have peripheries joined together to seal the closed chamber air-tightly which is filled with the gel. The peripheries of the first and second diaphragms may be jointed by laser-welding.

The first diaphragm may be made of material which is higher in heat and erosion resistance than that of the second diaphragm.

The first diaphragm may be lower in spring constant than the second diaphragm to absorb a change in volume of the gel to minimize transmission thereof to the second diaphragm. This is achieved by designing the first diaphragm to be smaller in thickness than the second diaphragm or have a deformable area smaller in diameter than a deformable area of the second diaphragm.

The closed chamber has a thickness in a thickness-wise direction the diaphragm assembly. The thickness of the closed chamber is smaller than a distance between ends of the closed chamber in a radius direction of the diaphragm assembly, thereby minimizing the loss in transmitting the pressure to the pressure transmitting member.

The casing may be designed to be mounted in a mount member to establish a thermal connection between the second diaphragm and the mount member. The pressure to be measured may be pressure, as produced by combustion in an engine.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
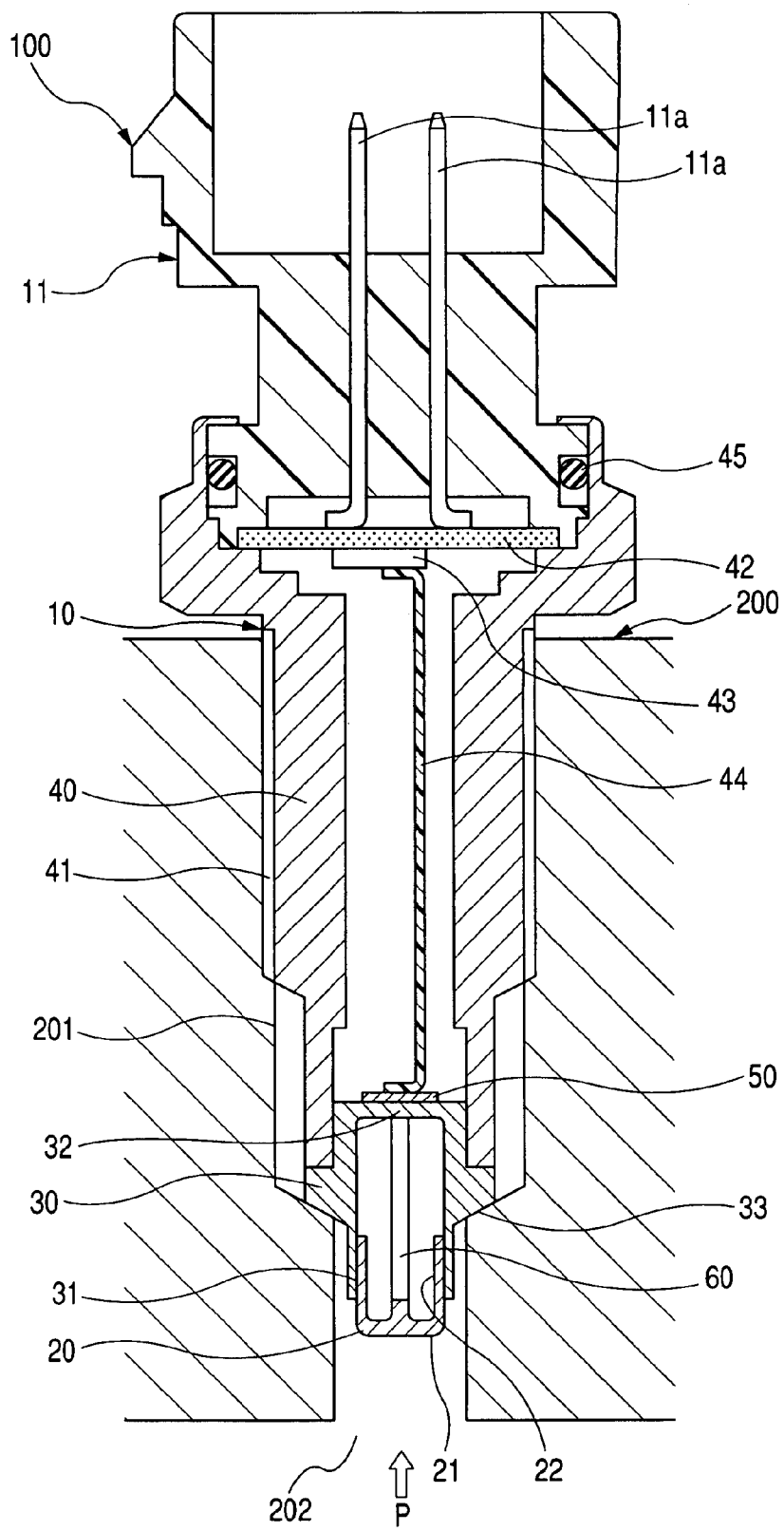
FIG. 1 is a longitudinal sectional view which shows a pressure sensor according to the first embodiment of the invention which is mounted in an internal combustion engine.

Referring to the drawings, wherein like reference numbers refer to like parts in several views, particularly to FIG. 1 there is shown a pressure sensor 100 according to the invention which is, as an example, illustrated in FIG. 1 as being installed in a cylinder head of an internal combustion engine 200 to measure the pressure Pin a combustion chamber 202 (will also be referred to as a combustion pressure P below).

The pressure sensor 100 consists essentially of a cylindrical casing 10 and a connector 11 joined to the casing 10. The engine 200 has a mounting hole 201 leading to the combustion chamber 202. The casing 10 of the pressure sensor 100 has a lower portion, as viewed in FIG. 1, inserted into the mounting hole 201 and exposed to the combustion chamber 202.

The casing 10 has installed on the top thereof a pressure sensing diaphragm assembly 20 on which the combustion pressure P is to be exerted. The casing 10 is made up of a cylindrical metallic stem 30 and a cylindrical housing 40 which are joined together by welding, brazing, or gluing. The connector 11 is fit in an upper end, as viewed in FIG. 1, of the housing 40.

The housing 40 is made of metallic material such as stainless steel and has formed on the periphery thereof a thread 41 for securing the pressure sensor 100 in the mounting hole 201 of the engine 200. Specifically, the installation of the pressure sensor 100 in the engine 200 is achieved by screwing the thread 41 into the mounting hole 201 to secure the casing 10 to the engine 200.

The metallic stem 30 is formed by a hollow cylindrical member made of, for example, stainless steel. The metallic stem 30 has an open end 31 in which the diaphragm assembly 20 is fit and a thin-walled flexible end 32 opposed to the open end 31.

The flexible end 32 of the metallic stem 30 is responsive to application of the pressure P exerted on the diaphragm assembly 20 through a pressure transmitting mechanism, as will be described later in detail, to flex or strain. The flexible end 32 has affixed thereto a pressure sensing device 50 which works to output a signal as a function of the pressure acting on the flexible end 32.

The pressure sensing device 50 is implemented by, for example, strain gauges each of which is made of a semiconductor chip equipped with a diffused resistor and which are connected to form a bridge circuit. The pressure sensing device 50 is glued to the metallic stem 30 through a low-melting glass.

The metallic stem 30 has an annular tapered sealing surface 33 formed on the periphery thereof. The sealing surface 33 extends outwardly around the whole of the periphery of the metallic stem 30. The mounting hole 210 has formed on an inner wall thereof a tapered seat contoured to conform with the sealing surface 33. Specifically, when the pressure sensor 100 is screwed into the mounting hole 201 tightly, it will urge the sealing surface 33 of the casing 10 into abutment with the tapered seat of the mounting hole 210 to establish a hermetic seal between the combustion chamber 202 and the mounting hole 201.

The diaphragm assembly 20 is joined to the open end 31 of the metallic stem 30 (i.e., the top end of the casing 10). The diaphragm assembly 20 has an end surface working as a pressure-exposed surface 21 which is exposed to the combustion chamber 202 and on which the combustion pressure P acts.

When the engine 200 is operating, it will cause the combustion pressure P, as produced by combustion of an air-fuel mixture in the combustion chamber 202, to act on the pressure-exposed surface 21 of the diaphragm assembly 20 cyclically, so that the pressure-exposed surface 21 is flexed or deformed.

Figure 2:
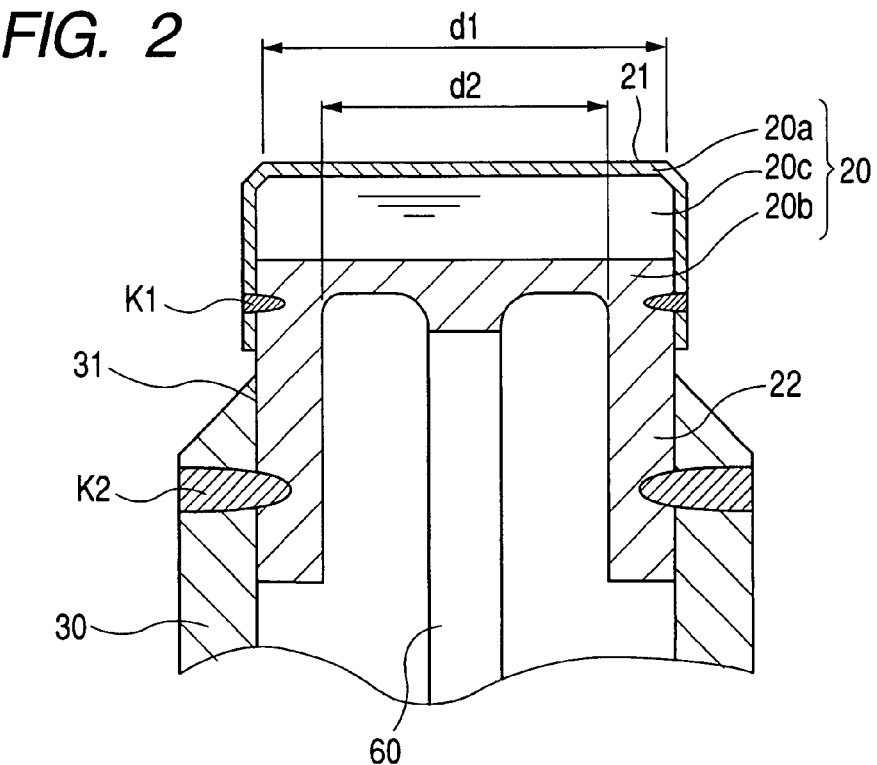
FIG. 2 is a partially enlarged view of FIG. 1.

FIG. 2 is an enlarged view which shows a portion of the pressure sensor 100 around the diaphragm assembly 20. The diaphragm assembly 20 includes a cap-shaped first diaphragm 20a defining the pressure-exposed surface 21 and a hollow cylindrical second diaphragm 20b partially fit in the metallic stem 30 of the casing 10.

The first and second diaphragms 20a and 20b are each made of a cylindrical bottomed plate and joined together by laser-welding overall circumferences thereof. The weld between the first and second diaphragms 20a and 20b is denoted at K1 in FIG. 2.

The weld K1 establishes an air-tight seal to define a hermetically enclosed chamber between the first and second diaphragms 20a and 20b. The chamber is filled with oil 20c. The oil 20c is a heat-resisting oil which is excellent in resistance to intense heat so that it resists decomposition when exposed to the heat as produced by combustion of the mixture in the engine 200. For example, the oil 20c is fluorine oil or silicon oil.

The diaphragm assembly 20 has an end portion 22 which extends inwardly (i.e., downward, as viewed in FIG. 2) from the pressure-exposed surface 21 and is inserted into the open end 31 of the metallic stem 30.

The end portion is the part of the second diaphragm 20b. The end portion 22 is connected to the metallic stem 30 together by laser-welding overall circumferences thereof. The weld between the end portion 22 and the metallic stem 30 is denoted at K2 in FIG. 2. The weld K2 establishes a joint of the second diaphragm 20b to the engine 200 thermally through the metallic stem 30 (i.e., the casing 10).

The first and second diaphragms 20a and 20b are made of the same material, but however, the first diaphragm 20a may be made of any material higher in heat and erosion resistance than that of the second diaphragm 20b because the first diaphragm 20a is exposed more to the combustion of the mixture than the second diaphragm 20b.

The first and second diaphragms 20a and 20b may be made of stainless steel. For example, the first diaphragm 20a may be made of USU630 or SUS631. The second diaphragm 20b may be made of the same material as that of the first diaphragm 20a or alternatively stainless steel lower in heat and erosion resistance than that of the first diaphragm 20a.

The first diaphragm 20a is lower in spring constant than the second diaphragm 20b, so that it may absorb a more change in volume of the oil 20c arising from a change in temperature thereof than the second diaphragm 20b. Specifically, the first diaphragm 20a is thinner than the second diaphragm 20b to have a lower spring constant.

The diaphragm assembly 20 has, for example, the following dimensions, as viewed vertically in FIG. 2. The thickness of the first diagram 20a is approximately 0.1 mm. The thickness of the layer of the oil 20c is approximately 0.3 mm to 0.5 mm. The thickness of the second diaphragm 20b is approximately 0.3 mm The first diaphragm 20a has a deformable area whose diameter d1 is greater than a diameter d2 of a deformable area of the second diaphragm 20b. This causes the spring constant of the first diaphragm 20a to be smaller than that of the second diaphragm 20b. The deformable area of each of the first and second diaphragms 20a and 20b is an area which is to be flexed or deformed upon application of the combustion pressure P.

The chamber which is defined between the first and second diaphragms 20a and 20b and filed with the oil 20c has a thickness smaller than a diameter thereof. In other words, a vertical distance of the chamber, as viewed in FIG. 2, is smaller than a lateral maximum distance thereof.

The diaphragm assembly 20 is fabricated by putting the oil 20c in the cup-shaped first diaphragm 20a placed in orientation reverse to that in FIG. 2 and placing the second diaphragm 20b on the oil 20c in the first diaphragm 20a. In order to avoid the existence of air in the oil 20c, the second diaphragm 20b is preferably forced into the first diaphragm 20a to the extent that the oil 20c spills slightly over the first diaphragm 20b. Finally, the first and second diaphragms 20a and 20b are welded by laser to complete the diaphragm assembly 20.

Within the cylindrical chamber of the metallic stem 30 of the casing 10, as illustrated in FIG. 1, a pressure transmitting bar 60 is disposed which is made of metallic material such as stainless steel or ceramic material.

The pressure transmitting bar 60 has ends urged elastically into constant abutment with the inner surface of the flexible end 32 and the inner surface of the second diaphragm 20b which is opposed to the pressure-exposed surface 21 of the diaphragm assembly 20.

When the combustion pressure P is exerted on the pressure-exposed surface 21 of the diaphragm assembly 20, it is transferred to the second diaphragm 20b through the oil 20c, to the pressure transmitting bar 60, and to the flexible end 201 of the metallic stem 30. The pressure sensing device 50 is then sensitive to the pressure, as exerted on the flexible end 201, to output a signal indicative thereof.

Within the housing 40, a printed circuit board 42 made of ceramic is disposed. The circuit board 42 has an IC chip 43 affixed thereto through bonding wires. The IC chip 43 works to amplify or regulate the output from the pressure sensing device 50.

The IC chip 43 is joined electrically to the pressure sensing device 50 through a connecting unit 44 made up of a FPC (Flexible Printed Card), leads, etc.

The connector 11 is joined at an end thereof to the housing 40 through an O-ring 45. The connector 11 is made of resin and has terminals 11a insert-molded therein. The joining of the connector 11 to the housing 40 is, as clearly illustrated in FIG. 1, achieved by crimping an open end of the housing 40 inwardly.

The terminals 11a of the connector 11 are electrically connected to the circuit board 42 within the housing 40. The terminals 11a are designed to be connectable with an ECU of automobiles to establish transmission of signals the pressure sensor 100 and the ECU.

The diaphragm assembly 20 is, as described above, designed to have the chamber between the first diaphragm 20a and the second diaphragm 20b filled with the oil 20c, thus resulting in an increase in thickness of the sensitive head of the diaphragm assembly 20 (i.e., a total thickness of the diaphragm assembly 20) as compared with the absence of the oil 20c. The oil 20c that is liquid works to transfer the pressure P exerted on the first diaphragm 20a to the pressure transmitting bar 60 through the second diaphragm 20b. Use of such oil, therefore, ensures the sensitivity of the diaphragm assembly 20 higher than that in the case where the same thickness as the total thickness of the first and second diaphragms 20a and 20b and the layer of the oil 20c is formed only by a solid material. The thermal energy in the first diaphragm 20a is transmitted to the oil 20c, thus keeping the first diaphragm 20a at low temperatures. Specifically, the increasing of the thickness of the diaphragm assembly 20 by the oil 20c contributes to the increasing of the heat capacity of the diaphragm assembly 20, but not deteriorate the sensitivity of the diaphragm assembly 20.

Specifically, the structure of the pressure sensor 100 is designed to have an increased heat capacity without sacrificing the sensitivity of the diaphragm assembly 20 and also increasing the total thickness of the diaphragm assembly 20, thus eliminating the need for a special separate cooling mechanism and minimizing the thermal distortion of the diaphragm assembly 20.

The first diaphragm 20a is, as described above, designed to be smaller in thickness and greater in diameter than the second diaphragm 20b to have a smaller spring constant than that of the second diaphragm 20b, thereby facilitating ease of absorbing a change in volume of the layer of the oil 20c. Specifically, if the oil 20c thermally expands, so that the second diaphragm 20b is distorted, which is, in turn, transmitted to the pressure transmitting bar 60, it may result in an error of output of the pressure sensor 100. In order to alleviate this problem, the first diaphragm 20a is designed to have a smaller spring constant than that of the second diaphragm 20b to minimize the transmission of a change in volume of the oil 20c to the pressure transmitting bar 60.

The chamber filled with the oil 20c has the diameter greater than the thickness thereof, thereby minimizing the time loss in transmitting the combustion pressure P from the first diaphragm 20a to the second diaphragm 20b.

The second diaphragm 20b is joined to the engine 200 through the casing 10, thereby enhancing the transmission of heat to which the diaphragm assembly 20 is exposed to the engine 200 to minimize the thermal distortion of the whole of the diaphragm assembly 20.

The diaphragm assembly 20 may alternatively use another type of liquid such as water instead of the oil 20c.

Figure 3:
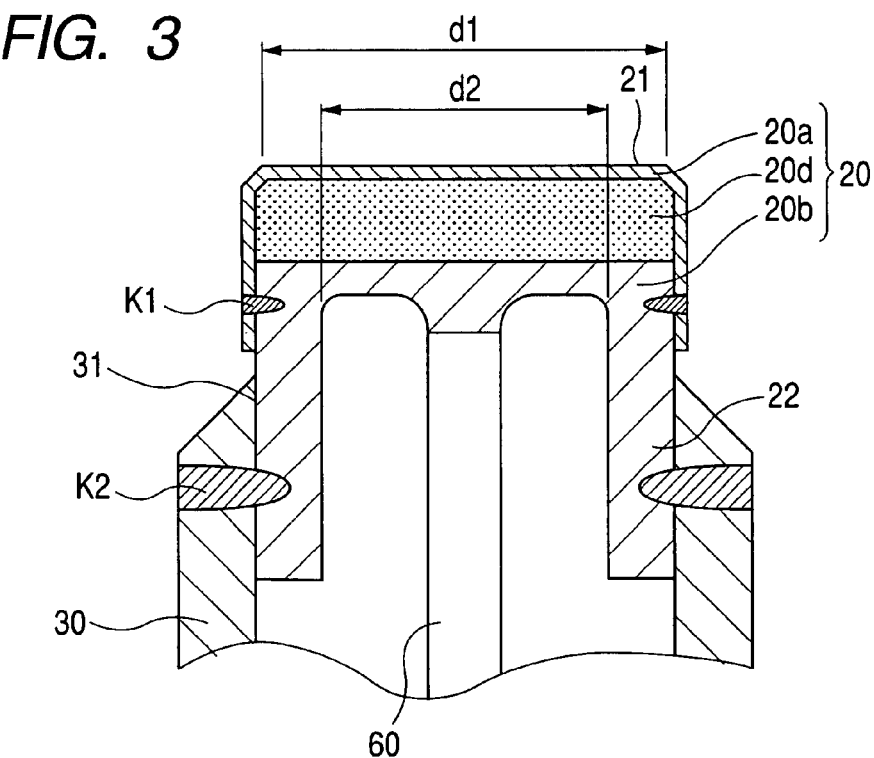
FIG. 3 is a partially enlarged view which shows a pressure sensor according to the second embodiment of the invention.

FIG. 3 is a partially longitudinal sectional view which shows the pressure sensor 100 according to the second embodiment of the invention.

The diaphragm assembly 20 is made up of the first diaphragm 20a, the second diaphragm 20b, and a layer of gel 20d disposed in the chamber, like the first embodiment, between the first and second diaphragms 20a and 20b. The joining between the first and second diaphragms 20a and 20b and between the metallic stem 30 and the second diaphragm 20b are achieved in the same manner as in the first embodiment.

The gel 20d is, for example, fluoro gel, silicone gel, or phlorosilicone gel which is excellent in resistance to intense heat so that it resists decomposition when exposed to the heat as produced by combustion of the mixture in the engine 200.

The fabrication of the diaphragm assembly 20 is achieved in the same manner as in the first embodiment using the gel 20d instead of the oil 20c, and explanation thereof in detail will be omitted here.

When the combustion pressure P is exerted on the pressure-exposed surface 21 of the first diaphragm 20a, it is transferred to the second diaphragm 20b through the gel 20d, to the pressure transmitting bar 60, and to the flexible end 201 of the metallic stem 30. The pressure sensing device 50 is, like the first embodiment, sensitive to the pressure, as exerted on the flexible end 201, to output a signal indicative thereof.

The diaphragm assembly 20 is, like the first embodiment, designed to have the chamber between the first diaphragm 20a and the second diaphragm 20b filled with the gel 20d, thus resulting in an increase in thickness of the sensitive head of the diaphragm assembly 20 (i.e., a total thickness of the diaphragm assembly 20) as compared with the absence of the gel 20d. The gel 20d works to transfer the pressure P exerted on the first diaphragm 20a to the pressure transmitting bar 60 through the second diaphragm 20b. Use of such gel, therefore, ensures the sensitivity of the diaphragm assembly 20 higher than that in the case where the same thickness as the total thickness of the first and second diaphragms 20a and 20b and the layer of the gel 20d is formed only by a solid material.

The pressure sensor 100 of this embodiment is, like the first embodiment, designed to have an increased heat capacity without sacrificing the sensitivity of the diaphragm assembly 20 and also increasing the total thickness of the diaphragm assembly 20, thus eliminating the need for a typical separate cooling mechanism and minimizing the thermal distortion of the diaphragm assembly 20.

The first diaphragm 20a is, like the first embodiment, designed to be smaller in thickness and greater in diameter than the second diaphragm 20b to have a smaller spring constant than that of the second diaphragm 20b, thereby facilitating ease of absorbing a change in volume of the layer of the gel 20d to minimize the transmission thereof to the pressure transmitting bar 60 through the second diaphragm 20b.

The chamber filled with the gel 20d has the diameter greater than the thickness thereof, thereby minimizing the time loss in transmitting the combustion pressure P from the first diaphragm 20a to the second diaphragm 20b.

The second diaphragm 20b is joined to the engine 200 through the casing 10, thereby enhancing the transmission of heat to which the diaphragm assembly 20 is exposed to the engine 200 to minimize the thermal distortion of the whole of the diaphragm assembly 20.

Other arrangements are identical with those in the first embodiment, and explanation thereof in detail will be omitted here.

The structure of the pressure sensor 100 in each of the first and second embodiments may be modified as discussed below.

The first and second diaphragms 20a and 20b may be joined by the resistance welding, brazing, soldering, or bonding instead of the laser welding to define the hermetically closed chamber filled with the oil 20c or gel 20d.

The casing 10 is made up of the metallic stem 30 and the housing 40 joined together, but may alternatively be made of a one-piece member.

The pressure sensor 100 in each of the first and second embodiment is designed to measure the pressure, as produced by combustion of a mixture in the engine 200, but may be employed to measure another type of pressure.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A pressure sensor comprising:
   a casing;
   a pressure sensing device working to output a signal as a function of pressure exerted thereon;
   a pressure sensing diaphragm assembly installed in said casing, said pressure sensing diaphragm assembly including a first diaphragm, a second diaphragm, and liquid, the first diaphragm having a pressure-exposed surface which is flexible when exposed to pressure to be measured, the first diaphragm being joined to the second diaphragm to define a closed chamber filled with the liquid to transmit the pressure acting on the pressure-exposed surface of the first diaphragm to the second diaphragm; and
   a pressure transmitting member disposed in said casing to transmit the pressure, as transmitted from the first diaphragm to the second diaphragm through the liquid, to said pressure sensing device.

2. A pressure sensor as set forth in claim 1, wherein the liquid is oil.

3. A pressure sensor as set forth in claim 2, wherein the oil is one of fluorine oil and silicon oil.

4. A pressure sensor as set forth in claim 1, wherein the first and second diaphragms have peripheries joined together to seal the closed chamber air-tightly which is filled with the liquid.

5. A pressure sensor as set forth in claim 4, wherein the peripheries of the first and second diaphragms are jointed by laser-welding.

6. A pressure sensor as set forth in claim 1, wherein the first diaphragm is made of material which is higher in heat and erosion resistance than that of the second diaphragm.

7. A pressure sensor as set forth in claim 1, wherein the first diaphragm is lower in spring constant than the second diaphragm to absorb a change in volume of the liquid to minimize transmission thereof to the second diaphragm.

8. A pressure sensor as set forth in claim 7, wherein the first diaphragm is smaller in thickness than the second diaphragm.

9. A pressure sensor as set forth in claim 7, wherein the first diaphragm has a deformable area smaller in diameter than a deformable area of the second diaphragm.

10. A pressure sensor as set forth in claim 1, wherein the closed chamber has a thickness in a thickness-wise direction of said diaphragm assembly, the thickness of the closed chamber being smaller than a distance between ends of the closed chamber in a radius direction of said diaphragm assembly.

11. A pressure sensor as set forth in claim 1, wherein said casing is to be mounted in a mount member to establish a thermal connection between the second diaphragm and the mount member.

12. A pressure sensor as set forth in claim 1, wherein the pressure to be measured is pressure, as produced by combustion in an engine.

13. A pressure sensor comprising:
a casing;
a pressure sensing device working to output a signal as a function of pressure exerted thereon;
a pressure sensing diaphragm assembly installed in said casing, said pressure sensing diaphragm assembly including a first diaphragm, a second diaphragm, and gel, the first diaphragm having a pressure-exposed surface which is flexible when exposed to pressure to be measured, the first diaphragm being joined to the second diaphragm to define a closed chamber filled with the gel to transmit the pressure acting on the pressure-exposed surface of the first diaphragm to the second diaphragm; and
a pressure transmitting member disposed in said casing to transmit the pressure, as transmitted from the first diaphragm to the second diaphragm through the gel, to said pressure sensing device.

14. A pressure sensor as set forth in claim 13, wherein the gel is one of fluoro gel, silicone gel, and phlorosilicone gel.

15. A pressure sensor as set forth in claim 13, wherein the first and second diaphragms have peripheries joined together to seal the closed chamber air-tightly which is filled with the gel.

16. A pressure sensor as set forth in claim 15, wherein the peripheries of the first and second diaphragms are jointed by laser-welding.

17. A pressure sensor as set forth in claim 13, wherein the first diaphragm is made of material which is higher in heat and erosion resistance than that of the second diaphragm.

18. A pressure sensor as set forth in claim 13, wherein the first diaphragm is lower in spring constant than the second diaphragm to absorb a change in volume of the gel to minimize transmission thereof to the second diaphragm.

19. A pressure sensor as set forth in claim 18, wherein the first diaphragm is smaller in thickness than the second diaphragm.

20. A pressure sensor as set forth in claim 18, wherein the first diaphragm has a deformable area smaller in diameter than a deformable area of the second diaphragm.

21. A pressure sensor as set forth in claim 13, wherein the closed chamber has a thickness in a thickness-wise direction said diaphragm assembly, the thickness of the closed chamber being smaller than a distance between ends of the closed chamber in a radius direction of said diaphragm assembly.

22. A pressure sensor as set forth in claim 13, wherein said casing is to be mounted in a mount member to establish a thermal connection between the second diaphragm and the mount member.

23. A pressure sensor as set forth in claim 13, wherein the pressure to be measured is pressure, as produced by combustion in an engine.

* * * * *